US008543761B2

(12) United States Patent
Goldick

(10) Patent No.: US 8,543,761 B2
(45) Date of Patent: Sep. 24, 2013

(54) ZERO REBUILD EXTENSIONS FOR RAID

(75) Inventor: Jonathan S. Goldick, San Francisco, CA (US)

(73) Assignee: LSI Corporation, San Jose, CA (US)

( * ) Notice: Subject to any disclaimer, the term of this patent is extended or adjusted under 35 U.S.C. 154(b) by 232 days.

(21) Appl. No.: 13/083,301

(22) Filed: Apr. 8, 2011

(65) Prior Publication Data
US 2012/0260035 A1    Oct. 11, 2012

(51) Int. Cl.
*G06F 13/00*    (2006.01)
*G06F 13/28*    (2006.01)

(52) U.S. Cl.
USPC .............. 711/114; 711/162; 711/E12.002

(58) Field of Classification Search
USPC .................... 711/114, 162, E12.002
See application file for complete search history.

(56) References Cited

U.S. PATENT DOCUMENTS

| 6,496,908 | B1 * | 12/2002 | Kamvysselis et al. ........ 711/162 |
| 2005/0050381 | A1 | 3/2005 | Maddock |
| 2006/0075294 | A1 | 4/2006 | Ma et al. |
| 2007/0220201 | A1 * | 9/2007 | Gill et al. ............... 711/113 |
| 2010/0169571 | A1 | 7/2010 | Kamalavannan et al. |
| 2011/0035605 | A1 * | 2/2011 | McKean et al. ........... 713/300 |
| 2012/0054252 | A1 * | 3/2012 | Olderdissen et al. ........ 707/823 |

OTHER PUBLICATIONS

Weil, Sage A., et al., CRUSH: Controlled, Scalable, Decentralized Placement of Replicated Data, Storage Systems Research Center, University of California, Santa Cruz, Nov. 2006, Tampa, Florida, USA, 0-7695-2700 0/06 2006 IEEE.

* cited by examiner

*Primary Examiner* — Edward Dudek, Jr.
(74) *Attorney, Agent, or Firm* — Christopher P. Whitham; Cochran Freund & Young LLC

(57) ABSTRACT

Disclosed is a method of reliably operating a RAID storage system. A first block of data is striped across a plurality of drives following a CRUSH algorithm. The first block of data is again striped across a second plurality of drives to a D'+P' stripe and placed on free drive space following the CRUSH algorithm. The data is written in an asynchronous fashion and possibly at a time when system utilization is low.

30 Claims, 3 Drawing Sheets

ZERO REBUILD EXTENSIONS FOR RAID

BACKGROUND OF THE INVENTION

The present invention relates generally to the field of data storage networks and data protection. In conventional Redundant Array of Independent Disks, herein referred to simply as RAID, there are a number of data drives (D) and likely one or more parity drives (P). When a write request is processed, data is written to a stripe that covers both the D and P drives. In the event of a disk failure, reconstruction of data that was on the failed drive is performed by reading data from the remaining drives, XOR'ing the result, and writing that result to a spare drive. XOR'ing the result is a term used to describe comparing data to find one or the other, but not both. This process is time consuming and processor intensive, furthermore the time for reconstruction of data increases linearly with drive capacity. Doubling the drive size doubles the rebuild time.

SUMMARY

An embodiment of the present invention may therefore comprise a method for reliably storing data in a computer system including writing a first block of data to a D+P stripe to a first plurality of drives following the CRUSH algorithm and writing the first block of data to a D'+P' stripe to a second plurality of drives, the additional D'+P' stripe being placed on free space on the second plurality of drives following the CRUSH algorithm.

An embodiment of the present invention may further comprise a zero-rebuild redundant array of independent disks (RAID) storage system, including a plurality of data drives with n-number of the data drives where n is a number 2 or greater, a storage controller to read and write data to said plurality of data drives, first data redundancy scheme executing the CRUSH algorithm on a first set of data drives, second data redundancy scheme executing the CRUSH algorithm on a second set of data drives, data redundancy and RAID stripe provided for said data drives, and a RAID processor configured to receive said RAID stripe.

An embodiment of the present invention may further comprise a computer readable medium having instructions stored thereon for operating a redundant array of independent disks (RAID) storage system that, when executed by a computer, at least direct the computer to determine a plurality of data drives with n-number of said data drives where n is a number 2 or greater, implement a storage controller to read and write data to said plurality of data drives, determine a first data redundancy scheme executing the CRUSH algorithm on a first set of data drives, determine a second data redundancy scheme executing the CRUSH algorithm on a second set of data drives, create a data redundancy and RAID stripe provided for said data drives, and create a RAID processor configured to receive said RAID stripe.

DETAILED DESCRIPTION OF THE EMBODIMENTS

Figure 1:
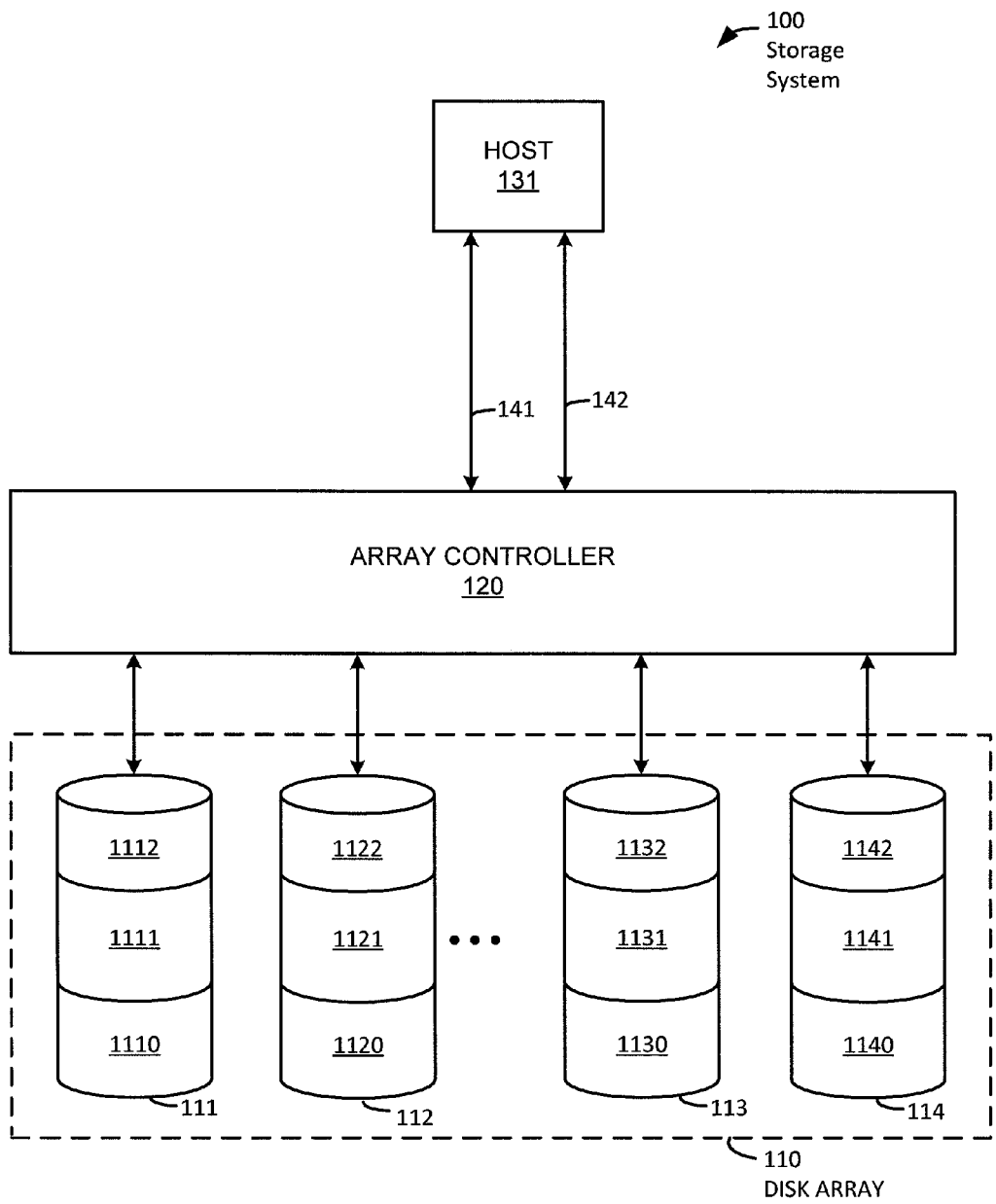
FIG. 1 is a block diagram illustrating a storage system.

FIG. 1 is a block diagram illustrating a storage system. In FIG. 1, storage system 100 is comprised of disk array 110, array controller 120, and virtual volume 142. Disk array 110 includes at least first drive 111, second drive 112, and up to n-number of drives. Disk array 110 may also include more disk drives or other network storage devices. However, these are omitted from FIG. 1 for the sake of brevity. First drive 111 comprises data blocks 1110, 1111, and 1112. Second drive 112 comprises data blocks 1120, 1121, and 1122. Third drive 113 comprises first data blocks 1130, 1131, and 1132. Fourth drive 114 comprises second data blocks 1140, 1141, and 1142.

Array controller 120 together with host 131 may be, or comprise, controllers that are compatible with or described by, for example, InfiniBand, Redundant Array of Inexpensive Disks (RAID), RAID CRUSH, Network Attached Storage (NAS), Storage Array Network (SAN), iSCSI SAN, or a Virtual Tape Library (VTL). Array controller 120 may be implemented on a single integrated circuit. In this case, array controller 120 may be referred to as RAID-on-a-chip (ROC).

Disk array 110, and drives 111-114 are operatively coupled to array controller 120. Thus, array controller 120 may operate to control, span, and/or stripe drives 111-114 and blocks 1110-1112, 1120-1122, 1130-1132, and 1140-1142 to provide RAID data redundancy. It should be noted that drives 111-114 may be actual physical drives, solid state drives, virtual drives or network storage devices. Thus, RAID stripes comprising one or more data blocks may be stored in a variety of combinations or mappings of data blocks 1110-1112 and 1120-1122 (and other data blocks, not shown).

Array controller 120 may project virtual volumes 141-142 to host 131. Array controller 120 may also project additional virtual volumes. However, these are omitted from FIG. 1 for the sake of brevity. Once created from the RAID configurations, virtual volumes 141-142 may be accessed by host computers.

In order to efficiently distribute data and system workload to maximize system performance, the CRUSH algorithm was developed. CRUSH stands for Controlled Replication Under Scalable Hashing and is a scalable, pseudo-random data distribution function designed for distributed object-based storage systems that efficiently maps data objects to storage devices without relying on a central directory.

Array controller 120 writes a redundant copy of data when free space is available within the total pool of drives or disk array 110 and when sufficient available input/output operations per second exist, or herein referred to as IOPS, to perform the extra write operations. As an example, in one embodiment, if space utilization across the disk array 110 is less than 50%, then sufficient room exists to effectively duplicate the entire data set. However, if space utilization is 75%, only 33% of the data set can be duplicated across disk array 110.

In an embodiment, storage system 100 writes redundant copies of data asynchronously as to not hinder application performance and for best overall system performance. Storage system 100 along with array controller 120 schedule writes to the D'+P' drives to be performed when the load on the system is sufficiently low. The array controller 120 has sufficient control to schedule IOPS to perform data writes when system load is sufficiently low. However, delaying data writes also increases the amount of data that does not have a zero-rebuild copy available. This configuration allows for a tradeoff between IOPS available for the application performance and zero-rebuild I/Os to minimize rebuild time. It is also possible to perform data writes while new data is still in dynamic random access memory, or DRAM, to avoid additional disk reads.

One embodiment of this invention provides rebuild performance linearly proportional to the amount of free disk space available in disk array 110. When disk drive space utilization in disk array 110 is 50% or less, rebuild time can be almost instantaneous. This embodiment leverages the observed situation that most allocated storage systems are not fully utilized. It is common practice to have a large percentage of unused storage space on current network storage systems.

Rebuild time increases linearly with drive size. In an embodiment, doubling a drive size in drives 111-112 will effectively double rebuild time. Drive space is growing at a rate that far outpaces drive speed. Making redundant copies of data is taking increasingly more time. Assuming low utilization in RAID storage system 100, redundant information can be readily stored. In the CRUSH algorithm, for example, assuming there is a 100 drive system and for every 1 MB block of data on each drive a random set of 10 drives is selected out of the 100 drives to backup the 1 MB block of data. For the next 1 MB block of data a different set of 10 random drives is chosen to store the data. In one embodiment, the CRUSH algorithm is performed by array controller 120 by taking a 1 MB block of data and storing the data on a random set of 10 drives in disk array 110, however, in the background, and at a time when the storage system 100 is idle or when extra IOPS are available, the first 10 drive choices from disk array 110 are removed from the selection and only the remaining 90 drives are available for write operations. The CRUSH algorithm is then performed by array controller 120 on the remaining 90 drives.

In an embodiment, storage system 100 performs D+P striping. This striping may be performed according to the CRUSH algorithm, however, the stripe is assigned an extra high-bit to differentiate the bit as a redundant copy or c-stripe', across the remaining N−(D+P) drives ensuring that redundant data is equally spread out across all disk drives in disk array 110 as well as ensuring that different drives are for primary versus redundant drives. System 100 may also, at a convenient time, perform another D'+P' stripe. This D'+P' stripe should be to a different set of drives in disk array 110. This different set should share nothing with the D+P set of drives. It should be understood that the second D'+P' stripe should only be written if sufficient space, not already used by other D+P (or possibly D'+P') stripes, is available. Alternatively, the drive set in storage system 100 may be chosen using a mapping or look-up table. Assigning drives in a pseudo-random fashion or predictable distribution based up the c-stripe number is also possible. Mapping information may be stored locally or may be stored anywhere on storage system 100.

In an embodiment, storage system 100 may write data from the outer tracks to the inner tracks as the outer tracks are faster. For user stored data in disk array 110, the data may be written on the outer most tracks of the drive. The outer tracks could be used to store user data and the inner tracks could be used to store backup copies of data.

In storage system 100 where one disk out of n-disks fails in disk array 110, the only stripes that need to be rebuilt through the standard RAID algorithm are those that used the failed drive and for which a redundant copy had not yet been made, or for which there was not sufficient free space available on disk array 110 for a backup. There will often be no such stripes unless there was substantial write activity by array controller 120 at the time the disk failed or in the event that total disk utilization exceeds 50%. As in the example above, where utilization exceeded 75%, there is still a linear reduction in the rebuild time as a function of free space. Redundant stripes can use alternate c-stripe' to access data so there is no need to perform a rebuild provided that the redundant copy is preserved. Marking the associated blocks as in use persistently will ensure that the redundant copy is preserved and will also ensure that all future accesses of the original c-stripe number is c-stripe'.

At some point it may be beneficial for storage system 100 to asynchronously make a redundant copy of c-stripe' if the original c-stripe has been lost to further allow storage system 100 to be zero-rebuild ready. It is logical to use the original c-stripe number and CRUSH placement algorithm to make this copy to allow c-stripe' to be once again considered as the redundant or backup copy on disk array 110. This is desirable as c-stripe' was likely placed on areas of the disks that are slower to access, as in the example above where redundant data is placed on inner tracks of the drive, reserving the faster regions of the disk for primary user data to be stored. When recreating the original c-stripe, array controller 120 selects a read optimized location, once again restoring the primary copy. Optimizing the location is not required; however, it facilitates the zero-rebuild and prepares storage system 100 in case of another disk failure. Parity drives in disk array 110 continue to ensure that normal RAID rebuilds can still be performed if additional drives in disk array 110 were to fail and zero-rebuild redundancy was not available.

In an embodiment, storage system 100 does not require that the redundant copy use the same values of D+P as the original c-stripe. A smaller value for P' in the redundant copy can stretch the available free space further and allow for full redundancy even if utilization exceeds 50% in disk array 110.

Storage system 100 may also perform an additional rebuild optimization that eliminates XOR operations when D equals D'. When a redundant copy of a stripe exists on disk array 110, the data on the failed drive exists in exact form on another drive, reading from D+P−1 drives should not be necessary nor performing an XOR for reconstruction. Performance increases are realized in storage system 100 as read operations are reduced significantly and CPU intensive XOR operations eliminated.

Multiple iterations of this embodiment may be performed by array controller 120 to make more than a single additional copy. If drive utilization in storage system 100 does not exceed 33%, two copies of every stripe can be made in the background on disk array 110 to maintain a zero-rebuild situation even if two drives failed.

In an embodiment, if disk array 110 utilization exceeds 50% or when needing space for a redundant copy for primary application usage, space must be reclaimed from disk array 110 and must be detectable at a later time by array controller 120. Building upon the free space map concept, this is easily achieved. Any bit set in the free space map by storage system 100 as in use by the primary stripe copies is, by definition, not being used for redundant copies. An update there is sufficient, provided performing a check before reading from a redundant copy. Storage system 100 may also maintain a bitmap of redundant stripe blocks in use. This bitmap will never have the same bits set as the primary bitmap, however, it allows detection when a redundant copy has been created on disk array 110. Some additional optimizations can me made under certain assumptions.

In one embodiment, assuming that logical block addresses (LBA) are assigned by array controller 120 in ascending order from 0, the highest LBA(s) can be used for redundant copies and work downward towards the middle. Using LBA(s) in this manner on disk array 110 makes it very simple to keep track of which stripes can possibly have redundant copies. A similar optimization may be performed under the assumption that host 131 consumes LBA(s) in descending order. These cases do not work well for hosts that use LBA(s) all over the allowable range or assign blocks indiscriminately, nor do they work well when blocks are released via TRIM in a fairly random fashion. This also does not work as well when an LUN and its corresponding LBA range is grown.

In an embodiment, storage system 100 may fill bitmaps as described above. When redundant copy becomes obsolete, because of an update to the primary or a TRIM type operation, array controller 120 records the update in the free space map. IO(s) to maintain these bit maps can become expensive. Non-volatile memory can be leveraged to record this efficiently and stage updates to backing disks. This can be very effective, given in the typical case the creation of the redundant copy of a stripe happens shortly after array controller 120 writes the primary copy and reclaims a redundant copy when performing TRIM or performing another write.

In an embodiment, storage system 100 can improve read performance by selecting the copy from the drive in disk array 110 with the lightest load or where the disk arm on a drive 111-114 is closest to the LBA to reduce latency when multiple copies of a stripe are available.

Figure 2:
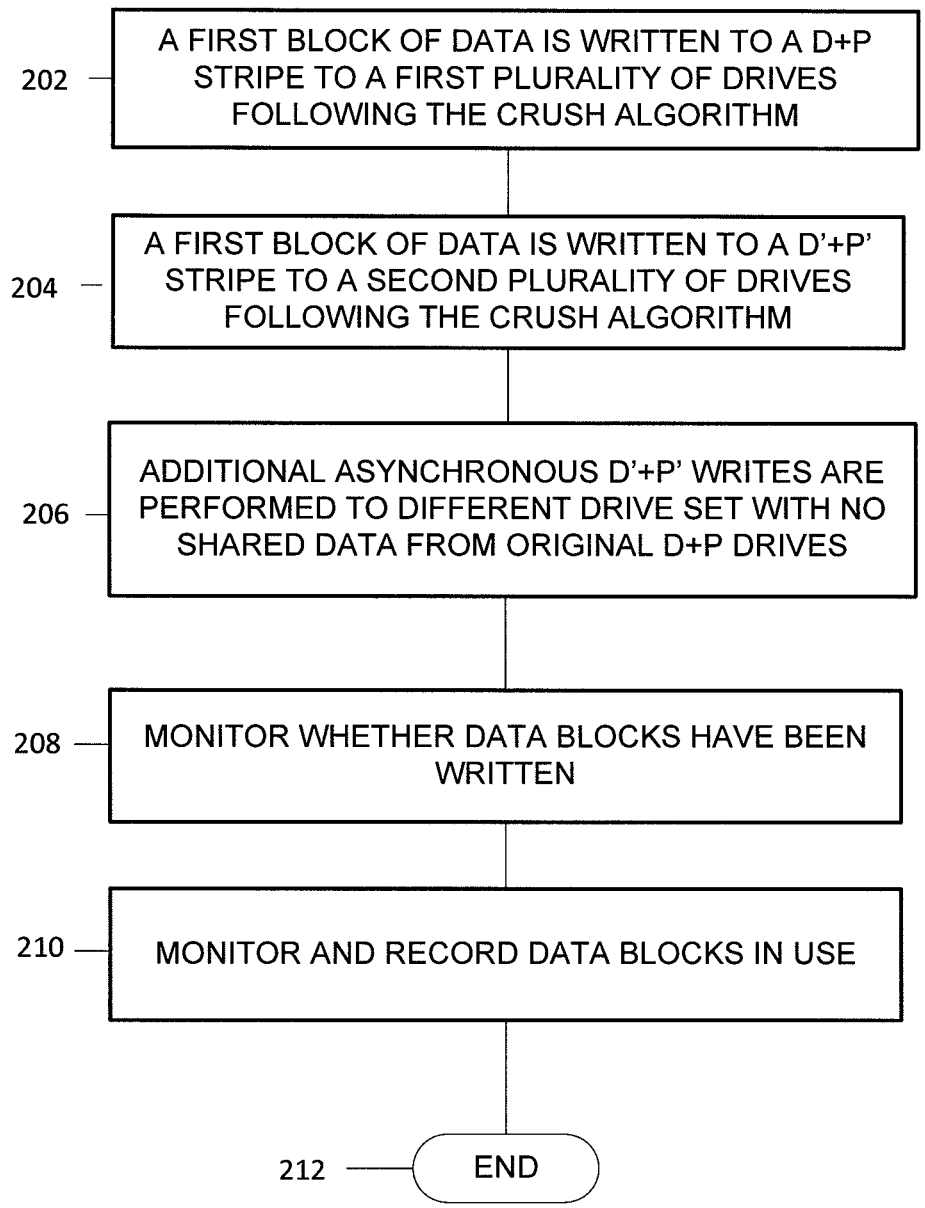
FIG. 2 shows an example of asynchronous data striping in a storage system.

FIG. 2 is a flowchart showing an example of asynchronous data striping on a RAID storage system. The steps illustrated in FIG. 2 may be performed by one or more elements of storage system 100.

As illustrated in FIG. 2, a first block of data is written to the data (D) and parity (P) drives 111-112 following the CRUSH algorithm (202). For example, storage system 100 continues to write a first data block to a D'+P' stripe to a second plurality of drives 113-114 following the CRUSH algorithm (204). Data is written in an asynchronous fashion during a time that is convenient to the array controller 120 to a different set of D'+P' drives that share nothing with the original D+P drives chosen (206), but only if space that is known not to be otherwise in use. Space utilization can be monitored by recording whether the data blocks have ever been written to by a host and to monitor when specific blocks are no longer in use (208) by the owning host operating system. Persistent monitoring and recording of the data blocks in use is necessary (210). The process is complete at step 212.

The systems, units, drives, and functions described above may be implemented with or executed by one or more computer systems. The methods described above may also be stored on a computer readable medium. Many of the elements of storage system 100 may be, comprise, or include computers systems. This includes, but is not limited to array controller 120, host 131, disk array 110, and any drives encompassed in storage system 100.

Figure 3:
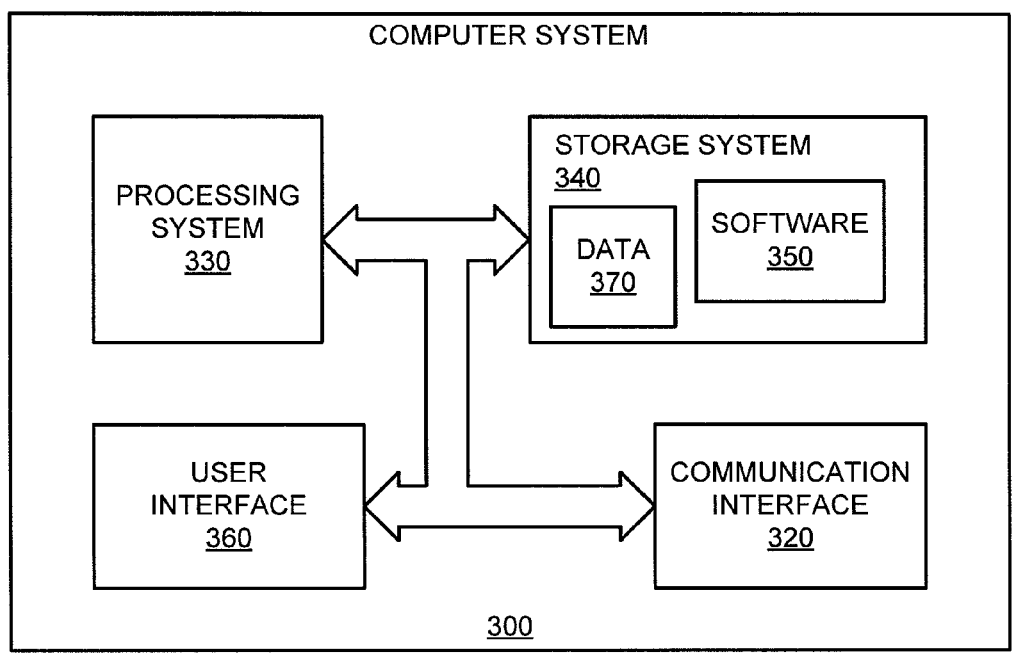
FIG. 3 illustrates a block diagram of a computer system.

FIG. 3 illustrates a block diagram of a computer system. Computer system 300 includes communication interface 320, processing system 330, storage system 340, and user interface 360. Processing system 330 is operatively coupled to storage system 340. Storage system 340 stores software 350 and data 370. Processing system 330 is operatively coupled to communication interface 320 and user interface 360. Computer system 300 may comprise a programmed general-purpose computer. Computer system 300 may include a microprocessor. Computer system 300 may comprise programmable or special purpose circuitry. Computer system 300 may be distributed among multiple devices, processors, storage, and/or interfaces that together comprise elements 320-370.

Communication interface 320 may comprise a network interface, modem, port, bus, link, transceiver, or other communication device. Communication interface 320 may be distributed among multiple communication devices. Processing system 330 may comprise a microprocessor, microcontroller, logic circuit, or other processing device. Processing system 330 may be distributed among multiple processing devices. User interface 360 may comprise a keyboard, mouse, voice recognition interface, microphone and speakers, graphical display, touch screen, or other type of user interface device. User interface 360 may be distributed among multiple interface devices. Storage system 340 may comprise a disk, tape, integrated circuit, RAM, ROM, network storage, server, or other memory function. Storage system 340 may be a computer readable medium. Storage system 340 may be distributed among multiple memory devices.

Processing system 330 retrieves and executes software 350 from storage system 340. Processing system may retrieve and store data 370. Processing system may also retrieve and store data via communication interface 320. Processing system 350 may create or modify software 350 or data 370 to achieve a tangible result. Processing system may control communication interface 320 or user interface 370 to achieve a tangible result. Processing system may retrieve and execute remotely stored software via communication interface 320.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method for reliably storing data in a computer system comprising:

selecting a first plurality of drives from a total pool of drives to handle primary Redundant Array of Independent Disks (RAID) Data and Parity (D+P) striping according to Controlled Replication Under Scalable Hashing (CRUSH) algorithms;

writing a first block of data in said primary RAID D+P striping to said first plurality of drives in accord with said CRUSH algorithm;

selecting a second plurality of drives from a remainder pool of drives to handle redundant RAID Data plus Parity (D'+P') striping according to said CRUSH algorithm, said remainder pool of drives being said total pool of drives excluding said first plurality of drives selected from said total pool of drives, said second plurality of drives having free space not already used by other applications; and writing at least a portion of said first block of data in said redundant RAID D'+P' striping to said second plurality of drives in said free space of said second plurality of drives in accord with said CRUSH algorithm as at least a partial redundant copy of said primary RAID D+P striping such that said redundant RAID D'+P' striping as well as standard RAID rebuild algorithms for exclusive or (XOR) data and parity striping are available to rebuild said first data block when a drive in said first plurality of drives fails, and such that said free space used by said redundant RAID D'+P' striping is still available for primary application usage.

2. The method of claim 1 wherein said process of writing at least a portion of said first block of data in said redundant RAID D'+P' striping to said second plurality of drives further comprises said writing to said second plurality of drives being performed asynchronously during system idle time when extra Input/Output Operations (IOPS) are available without impact on primary application performance.

3. The method of claim 1 further comprising:
selecting at least one additional plurality of drives from a second remainder pool of drives to handle additional redundant RAID Data plus Parity (D'+P') striping according to said CRUSH algorithm, said second remainder pool of drives being said total pool of drives excluding said first and said second plurality of drives selected from said total pool of drives, said at least one additional plurality of drives having free space not already used by other applications; and
writing at least a portion of said first block of data in said at least one additional redundant RAID D'+P' striping to said at least one additional plurality of drives in said free space of said at least one additional plurality of drives in accord with said CRUSH algorithm as at least a partial redundant copy of said primary RAID D+P striping such that said at least one additional redundant RAID D'+P' striping and said redundant RAID D'+P' striping, as well as standard RAID rebuild algorithms for exclusive or (XOR) data and parity striping, are available to rebuild said first data block when a drive in said first plurality of drives fails, and such that said free space used by said at least one additional redundant RAID D'+P' striping is still available for primary application usage.

4. The method of claim 1 further comprising reclaiming at least a portion of storage space used for said redundant RAID D'+P' striping when said primary application usage requires space that is otherwise unavailable.

5. The method of claim 1 wherein said process of writing at least a portion of said first block of data in said redundant RAID D'+P' striping to said second plurality of drives further comprises writing all of said first block of data in said redundant RAID D'+P' striping to said second plurality of drives when space utilization across said total pool of drives is 50% or less.

6. The method of claim 1 further comprising scheduling said process of writing at least a portion of said first block of data in said redundant RAID D'+P' striping to said second plurality of drives while said first block of data is still in Dynamic Random Access Memory (DRAM).

7. The method of claim 1 further comprising improving read performance of said first block of data from said total pool of drives, said improvement of read performance being accomplished by at least one of a group consisting of: reading data from said primary RAID D+P striping or redundant RAID D'+P' from drives with lightest loading, and reading data from said primary RAID D+P striping or redundant RAID D'+P' from drives where data is located closest to a drive arm of said drives in order to reduce latency.

8. The method of claim 1 wherein said redundant RAID D'+P' striping is different than said primary RAID D+P striping.

9. The method of claim 1 further comprising:
rebuilding said primary RAID D+P striping when there are failed disks in said first plurality of drives by changing addressing to equivalent portions of said redundant RAID D'+P' striping; and
recreating said portions of said redundant RAID D'+P' striping readdressed to said primary RAID D+P striping on different non-overlapping drives of said total pool of drives in order to restore said redundant RAID D'+P' striping.

10. The method of claim 1 further comprising rebuilding said primary RAID D+P striping when there are failed disks in said first plurality of drives by copying equivalent portions of said redundant RAID D'+P' striping to new non-overlapping drives in said total pool of drives and addressing said new non-overlapping drives as said primary RAID D+P striping.

11. A zero-rebuild redundant array of independent disks (RAID) storage system, comprising:
a total pool of drives;
a first plurality of drives selected from said total pool of drives;
a second plurality of drives from a remainder pool of drives, said remainder pool of drives being said total pool of drives excluding said first plurality of drives selected from said total pool of drives, said second plurality of drives having free space not already used by other applications; and
a RAID storage controller that selects said first plurality of drives from said total pool of drives to handle primary RAID Data and Parity (D+P) striping according to Controlled Replication Under Scalable Hashing (CRUSH) algorithms, writes a first block of data in said primary RAID D+P striping to said first plurality of drives in accord with said CRUSH algorithm, selects said second plurality of drives from said remainder pool of drives to handle redundant RAID Data plus Parity (D'+P') striping according to said CRUSH algorithm, and writes at least a portion of said first block of data in said redundant RAID D'+P' striping to said second plurality of drives in said free space of said second plurality of drives in accord with said CRUSH algorithm as at least a partial redundant copy of said primary RAID D+P striping such that said redundant RAID D'+P' striping as well as standard RAID rebuild algorithms for exclusive or (XOR) data and parity striping are available to rebuild said first data block when a drive in said first plurality of drives fails, and such that said free space used by said redundant RAID D'+P' striping is still available for primary application usage.

12. The system of claim 11 wherein said RAID storage controller writes to said second plurality of drives asynchronously during system idle time when extra Input/Output Operations (IOPS) are available without impact on primary application performance.

13. The system of claim 11 further comprising:
at least one additional plurality of drives selected from a second remainder pool of drives, said second remainder pool of drives being said total pool of drives excluding said first and said second plurality of drives selected from said total pool of drives, said at least one additional plurality of drives having free space not already used by other applications; and
wherein said RAID storage controller further selects at least one additional plurality of drives from a second remainder pool of drives to handle additional redundant RAID Data plus Parity (D'+P') striping according to said CRUSH algorithm, and writes at least a portion of said first block of data in said at least one additional redundant RAID D'+P' striping to said at least one additional plurality of drives in said free space of said at least one additional plurality of drives in accord with said CRUSH algorithm as at least a partial redundant copy of said primary RAID D+P striping such that said at least one additional redundant RAID D'+P' striping and said redundant RAID D'+P' striping, as well as standard RAID rebuild algorithms for exclusive or (XOR) data and parity striping, are available to rebuild said first data block when a drive in said first plurality of drives fails, and such that said free space used by said at least one additional redundant RAID D'+P' striping is still available for primary application usage.

14. The system of claim 11 wherein said RAID storage controller further reclaims at least a portion of storage space used for redundant RAID D'+P' striping when said primary application usage requires space that is otherwise unavailable.

15. The system of claim 11 wherein said RAID storage controller writes all of said first block of data in said redundant RAID D'+P' striping to said second plurality of drives when space utilization across said total pool of drives is 50% or less.

16. The system of claim 11 wherein said RAID storage controller schedules said writes of at least a portion of said first block of data in said redundant RAID D'+P' striping to said second plurality of drives while said first block of data is still in Dynamic Random Access Memory (DRAM).

17. The system of claim 11 further comprising said RAID storage controller improved read performance of said first block of data from said total pool of drives, said improved read performance being accomplished by said RAID storage that operates by at least one of a group consisting of read data from said primary RAID D+P striping or redundant RAID D'+P' from drives with lightest loading, and read data from said primary RAID D+P striping or redundant RAID D'+P' from drives where data is located closest to a drive arm of said drives in order to reduce latency.

18. The system of claim 11 wherein said redundant RAID D'+P' striping is different than said primary RAID D+P striping.

19. The system of claim 11 wherein said RAID storage controller further rebuilds said primary RAID D+P striping when there are failed disks in said first plurality of drives by changing addressing to equivalent portions of said redundant RAID D'+P' striping, and recreates said portions of said redundant RAID D'+P' striping readdressed to said primary RAID D+P striping on different non-overlapping drives of said total pool of drives in order to restore said redundant RAID D'+P' striping.

20. The system of claim 11 wherein said RAID storage controller further rebuilds said primary RAID D+P striping when there are failed disks in said first plurality of drives by copying equivalent portions of said redundant RAID D'+P' striping to new non-overlapping drives in said total pool of drives and addressing said new non-overlapping drives as said primary RAID D+P striping.

21. A non-transitory computer readable medium having instructions stored thereon for operating a redundant array of independent disks (RAID) storage system that, when executed by a computer, at least direct said computer to:
select a first plurality of drives from a total pool of drives to handle primary Redundant Array of Independent Disks (RAID) Data and Parity (D+P) striping according to Controlled Replication Under Scalable Hashing (CRUSH) algorithms;
write a first block of data in said primary RAID D+P striping to said first plurality of drives in accord with said CRUSH algorithm;
select a second plurality of drives from a remainder pool of drives to handle redundant RAID Data plus Parity (D'+P') striping according to said CRUSH algorithm, said remainder pool of drives being said total pool of drives excluding said first plurality of drives selected from said total pool of drives, said second plurality of drives having free space not already used by other applications; and
write at least a portion of said first block of data in said redundant RAID D'+P' striping to said second plurality of drives in said free space of said second plurality of drives in accord with said CRUSH algorithm as at least a partial redundant copy of said primary RAID D+P striping such that said redundant RAID D'+P' striping as well as standard RAID rebuild algorithms for exclusive or (XOR) data and parity striping are available to rebuild said first data block when a drive in said first plurality of drives fails, and such that said free space used by said redundant RAID D'+P' striping is still available for primary application usage.

22. The computer readable medium of claim 21, wherein said computer instructions for writing at least a portion of said first block of data in said redundant RAID D'+P' striping to said second plurality of drives further comprise directing said write to said second plurality of drives to be performed asynchronously during system idle time when extra Input/Output Operations (IOPS) are available without impact on primary application performance.

23. The computer readable medium of claim 21, wherein said computer is further directed to:
select at least one additional plurality of drives from a second remainder pool of drives to handle additional redundant RAID Data plus Parity (D'+P') striping according to said CRUSH algorithm, said second remainder pool of drives being said total pool of drives excluding said first and said second plurality of drives selected from said total pool of drives, said at least one additional plurality of drives having free space not already used by other applications; and
write at least a portion of said first block of data in said at least one additional redundant RAID D'+P' striping to said at least one additional plurality of drives in said free space of said at least one additional plurality of drives in accord with said CRUSH algorithm as at least a partial redundant copy of said primary RAID D+P striping such that said at least one additional redundant RAID D'+P' striping and said redundant RAID D'+P' striping, as well as standard RAID rebuild algorithms for exclusive or (XOR) data and parity striping, are available to rebuild said first data block when a drive in said first plurality of drives fails, and such that said free space used by said at least one additional redundant RAID D'+P' striping is still available for primary application usage.

24. The computer readable medium of claim 21, wherein said computer is further directed to:
reclaim at least a portion of storage space used for said redundant RAID D'+P' striping when said primary application usage requires space that is otherwise unavailable.

25. The computer readable medium of claim 21, wherein said computer instructions for writing at least a portion of said first block of data in said redundant RAID D'+P' striping to said second plurality of drives further comprise directing said computer to write all of said first block of data in said redundant RAID D'+P' striping to said second plurality of drives when space utilization across said total pool of drives is 50% or less.

26. The computer readable medium of claim 21, wherein said computer instructions for writing at least a portion of said first block of data in said redundant RAID D'+P' striping to said second plurality of drives further comprise directing said computer to schedule said write of at least a portion of said first block of data in said redundant RAID D'+P' striping to said second plurality of drives while said first block of data is still in Dynamic Random Access Memory (DRAM).

27. The computer readable medium of claim 21, wherein said computer is further directed to:
improve read performance of said first block of data from said total pool of drives, said improvement of read performance being accomplished by directing said computer to perform at least one of a group consisting of: read data from said primary RAID D+P striping or redundant RAID D'+P' from drives with lightest loading, and read data from said primary RAID D+P striping or redundant RAID D'+P' from drives where data is located closest to a drive arm of said drives in order to reduce latency.

28. The computer readable medium of claim 21, wherein said redundant RAID D'+P' striping is different than said primary RAID D+P striping.

29. The computer readable medium of claim 21, wherein said computer is further directed to:
rebuild said primary RAID D+P striping when there are failed disks in said first plurality of drives by changing addressing to equivalent portions of said redundant RAID D'+P' striping; and
recreate said portions of said redundant RAID D'+P' striping readdressed to said primary RAID D+P striping on different non-overlapping drives of said total pool of drives in order to restore said redundant RAID D'+P' striping.

30. The computer readable medium of claim 21, wherein said computer is further directed to rebuild said primary RAID D+P striping when there are failed disks in said first plurality of drives by copying equivalent portions of said redundant RAID D'+P' striping to new non-overlapping drives in said total pool of drives and addressing said new non-overlapping drives as said primary RAID D+P striping.

* * * * *